United States Patent [19]

Shibata et al.

[11] 4,429,079
[45] Jan. 31, 1984

[54] ETHYLENE/ALPHA-OLEFIN COPOLYMER COMPOSITION

[75] Inventors: Yuzo Shibata, Nishinomiya; Seikoh Naganuma, Ohtake, both of Japan

[73] Assignee: Mitsui Petrochemical Industries, Ltd., Japan

[21] Appl. No.: 359,714

[22] PCT Filed: Aug. 7, 1981

[86] PCT No.: PCT/JP81/00173

§ 371 Date: Mar. 11, 1982

§ 102(e) Date: Mar. 11, 1982

[87] PCT Pub. No.: WO82/00470

PCT Pub. Date: Feb. 18, 1982

[30] Foreign Application Priority Data

Aug. 7, 1980 [JP] Japan .................. 55-107788

[51] Int. Cl.$^3$ .............................. C08L 23/08
[52] U.S. Cl. ................... 525/240; 428/35; 428/523
[58] Field of Search ........................... 525/240

[56] References Cited

U.S. PATENT DOCUMENTS 4,188,350  2/1980  Vicik et al. .................. 525/240

Primary Examiner—J. Ziegler
Attorney, Agent, or Firm—Wenderoth, Lind & Ponack

[57] ABSTRACT

This invention relates to a composition comprising a mixture of at least two ethylene-rich ethylene/alpha-olefin copolymers (A) and (B) below which has excellent transparency and impact strength and improved properties, particularly low-temperature heat sealability, heat seal strength and flexural resistance.

(A) 95 to 40% by weight of a random copolymer of ethylene and an alpha-olefin having 5 to 10 carbon atoms which has a melt index of 0.1 to 20 g/10 min., a density of 0.910 to 0.940 g/cm$^3$, a crystallinity by X-rays of 40 to 70%, a melting point of 115° to 130° C. and an ethylene content of 94 to 99.5 mole %; and (B) 5 to 60% by weight of a random copolymer of ethylene and an alpha-olefin having 3 to 10 carbon atoms which has a melt index of 0.1 to 50 g/10 min., a density of 0.870 to 0.900 g/cm$^3$, a crystallinity by X-rays of 5 to 40%, a melting point of 40° to 100° C. and an ethylene content of 85 to 95 mole %.

7 Claims, No Drawings

ETHYLENE/ALPHA-OLEFIN COPOLYMER COMPOSITION

FIELD OF TECHNOLOGY

This invention relates to an ethylene/alpha-olefin copolymer composition comprising a blend of ethylene/alpha-olefin copolymers which has excellent heat sealing properties and flexural resistance and improved properties suitable, for example, for packaging films.

BACKGROUND TECHNOLOGY

Techniques of setting off the defects of different kinds of films by laminating them into a composite have been known heretofore in the field of packaging bags. Particularly, in the field of packaging foodstuffs, laminated packaging bags composed of a resin layer having excellent transparency, mechanical properties, rigidity, heat resistance and gas-barrier property, such as polypropylene, a polyester, nylon, cellophane or an ethylene/vinyl alcohol copolymer, and a resin layer having good transparency and heat sealability, such as polyethylene, polypropylene or an ethylene/vinyl acetate copolymer have come into widespread use.

In order to produce such laminated packaging bags, there is usually employed a method which comprising heat-sealing the top and bottom end portions or all end portions of a film, and in the resulting bag, the innermost layer is a resin layer having good heat sealability. Accordingly, films use as the innermost layer of the packaging bags are required not only to have good heat sealing characteristics but also to be free from extraction or degradation of the resin components which may be caused by an article packaged therein. In recent years, there have been a variety of articles to be packed and a variety of modes of using the packaging materials and some problems have arisen with regard to films which have heretofore been used to form the heat sealed layer. These problems include, for example, the high and narrow heat-sealing temperature range of polypropylene films, the poor heat resistance, strength and oil resistance and acetic acid odor of ethylene/vinyl acetate copolymer films, the poor heat sealing strength and hot tack property of films of high-pressure low-density polyethylene, and the poor flexural resistance of each of such films which is likely to lead to the formation of pinholes in bags during handling in transportation, etc. and to cause leakage of the contents.

The present invention has successfully given a solution to the above new problems, and as will be described below in detail, provides an ethylene/alpha-olefin copolymer composition having excellent low-temperature heat sealability, heat seal strength, flexural resistance, transparency and impact strength and being suitable for packaging films.

DISCLOSURE OF THE INVENTION

The present inventors have made investigations about the solving of the above new problems, and found that a blend of at least two ethylene-rich ethylene/alpha-olefin random copolymers (A) and (B) having specified properties gives a solution to the above problems and exhibits excellent properties.

The investigations of the present inventors have led to the discovery that a blended composition of 95 to 40% of (A) a random copolymer of ethylene and an alpha-olefin having 5 to 10 carbon atoms which has a melt index of 0.1 to 20 g/10 min., a density of 0.910 to 0.940 g/cm$^3$, a crystallinity by X-rays of 40 to 70%, a melting point of 115° to 130° C. and an ethylene content of 94 to 99.5 mole% and 5 to 60% by weight of (B) a random copolymer of ethylene and an alpha-olefin having 3 to 10 carbon atoms which has a melt index of 0.1 to 50 g/10 min., a density of 0.870 to 0.900 g/cm$^3$, a crystallinity by X-rays of 5 to 40%, a melting point of 40° to 100° C. and an ethylene content of 85 to 95 mole% has excellent low-temperature heat sealability, heat seal strength and flexural resistance and other excellent properties, especially transparency and impact strength.

In the present invention, examples of the alpha-olefin having 5 to 10 carbon atoms to be copolymerized with ethylene in the copolymer (A) include 1-pentene, 1-hexene, 4-methyl-1-pentene, 1-octene and 1-decene, and mixtures of at least two of these alpha-olefins. Of these, alpha-olefins having 6 to 8 carbon atoms, especially 4-methyl-1-pentene and 1-octene, are preferred.

The melt index of the copolymer (A) should be in the range of 0.1 to 20 g/10 min., preferably 0.5 to 10 g/10 min. When the melt index is less than 0.1 g/10 min., the flowability of the resulting composition is poor and packaging bags of good quality are difficult to obtain. On the other hand, if the melt index exceeds 20 g/10 min., the resulting composition has poor impact strength, tear strength and heat seal strength, and does not suit the purpose of this invention. In view of a balance between the ease of polymerization and the impact strength and tear strength of the polymer, the copolymer (A) most preferably has a melt index of 1.0 to 5.0 g/10 min. The melt index, as used in this invention is a value measured at 190° C. under a load of 2160 g substantially in accordance with the method of ASTM-D-1238. The density of the copolymer (A) used in this invention should be not more than 0.940 g/cm$^3$, preferably not more than 0.935 g/cm$^3$, in order to ensure good hot tack property at heat sealing and impart good transparency and impact strength to packaging bags. The density of the copolymer in this invention is a value measured by the method of ASTM-D-1505. On the other hand, in order to provide films having excellent mechanical properties and oil resistance and being free from stickness, the copolymer (A) should have a density of at least 0.910 g/cm$^3$, preferably at least 0.920 g/cm$^3$. If the resin is sticky, films prepared therefrom undergo blocking, and therefore bags are difficult to make therefrom. If the oil resistance of the films is poor, they cannot be used as packaging bags for oily foods, etc. Thus, the purpose of the invention cannot be achieved.

The crystallinity by X-rays of the copolymer (A) of this invention has a correlation with its density, and should be in the range of 40 to 70%, preferably 50 to 65%. If the crystallinity of the copolymer (A) exceeds 70%, a mixture of it with the copolymer (B) does not have improved oil resistance. If the crystallinity is less than 40%, the resulting composition is soft and has poor mechanical properties.

The copolymer (A) has 1 or more, in many cases 2 or 3, and preferably 3, melting points (sharp peaks) determined from an endothermic curve measured by a differential scanning calorimeter (DSC) at a temperature raising rate of 10° C./min. the highest melting point of the copolymer (A) is 115° to 130° C., preferably 115° to 125° C. If the melting point is lower than 115° C., the resulting film has poor heat resistance, and if it exceeds 130° C., the resulting film has poor low-temperature heat sealability. The ethylene/alpha-olefin copolymer (A) used in this invention has an ethylene content of 94 to 99.5 mole%, preferably 95 to 99 mole%, more preferably 96 to 98 mole%.

The use of the copolymer (A) having a molecular weight distribution (the ratio of the weight average molecular weight to the number average molecular weight) of up to 6 in this invention is preferred because it will lead to a film having excellent transparency. For example, the molecular weight distribution is preferably about 1.5 to 6. The molecular weight distribution is a value determined by drawing a molecular weight distribution curve using a gel permeation chromatograph [the measuring device: Model 150C-LC/GPC, made of Waters Associates Company; the column: GMH-6, a product made by Toyo Soda Co., Ltd.; the solvent: o-dichlorobenzene; the measuring temperature: 135° C.], and calculating the weight average molecular weight (to be abbreviated as $\overline{M}_w$) and the number average molecular weight (to be abbreviated as $\overline{M}_n$) by a universal calibration method using polystyrene as a standard.

The distribution of the composition of the copolymer (A) used in this invention varies depending upon the catalyst used. The p-xylene soluble content (I) at room temperature and the boiling n-heptane-insoluble content are useful as measures of the range of the distribution of composition, and for example, in copolymers having the same average molecular weight and density, larger (I) values show a larger proportion of a portion having a low molecular weight and/or an amorphous portion. On the other hand, larger (II) values show a larger proportion of a polyethylene crystalline portion of the copolymer indicating that copolymerization has not taken place uniformly. Preferred as the copolymer (A) used in this invention are those copolymers which have a (I) value of not more than 10% by weight, especially not more than 7% by weight, and a (II) value of not more than 35% by weight with the sum of (I)+(II) being not more than 40% by weight. The boiling n-heptane-insoluble content and the p-xylene-soluble content at room temperature are measured by a Soxhlet extracting method.

An example of a suitable catalyst for the production of the copolymer (A) having the aforesaid properties used in this invention is a catalyst composed of a highly active titanium catalyst component formed of a magnesium compound and a titanium compound, such as a solid titanium catalyst component supported on a hydrocarbon-insoluble magnesium compound, and an organoaluminum compound. For example, the highly active titanium catalyst component may be a titanium-type catalyst supported on a magnesium-containing compound containing a magnesium-halide especially magnesium chloride, or magnesium oxide, which has a Cl/Ti weight ratio of preferably from 5 to 150, a Ti/Mg mole ratio of preferably from 3 to 90 and a surface area of at least 70 m²/g, conveniently at least 150 m²/g. Examples of such titanium catalyst component are the catalysts described in Japanese Patent Publication No. 32270/1975 (U.S. Pat. No. 4,071,674; West German OLS No. 2,346,471) and Japanese Laid-Open Patent Publication No. 95382/1975 (British Pat. No. 1,485,520; West German OLS No. 2,461,677), and these catalysts are preferred. Examples of the organoaluminum compound include organoaluminum compounds of the formula $R_nAlX_{3-n}$ (wherein R represents a hydrocarbon group such as an alkyl group, n is a number represented by $1 \leq n \leq 3$, and X represents hydrogen, chlorine, or an alkoxy group having 2 to 4 carbon atoms) as cocatalysts. A mixture of two or more of such organoaluminum compounds may also be used if its average composition satisfies the above formula. As organoaluminum compounds advantageous for the formation of polymers having excellent transparency, alkyl aluminum sesquichlorides and/or dialkylaluminum halides, particularly an alkyl aluminum halide and a mixture of it with a dialkyl aluminum halide, can be cited as preferred examples. Other organoaluminum compounds such as trialkylaluminums, dialkyl aluminum hydrides, dialkyl aluminum alkoxides, or alkyl aluminum alkoxyhalides can also be used, but are not so good for the transparency of the resulting polymers.

A suitable method for obtaining the copolymer (A) used in this invention can be carried out preferably in the co-presence of a hydrocarbon solvent or using the monomers themselves as a solvent at a temperature above the melting point of the copolymer formed, preferably at a temperature of at least about 140° C., preferably under such conditions that the solvent and the copolymer form a homogeneous phase. Preferably, the copolymerization is carried out continuously while maintaining the monomer concentration constant. The range of conditions under which the solvent and the copolymer form a homogeneous phase varies depending upon the type of the solvent, the concentrations (pressures) of the monomer, hydrogen, etc. in the solution, the polymerization temperature, the molecular weight (intrinsic viscosity) of the copolymer, etc. Desirably, therefore, the range is predetermined by performing a preliminary experiment. The polymerization is carried out preferably under pressure. For example, there can be employed pressures of about 2 to about 100 kg/cm², preferably about 15 to about 70 kg/cm². One example of the production of an ethylene/alpha-olefin random copolymer suitable for use in this invention as above is by the method described in detail in Japanese Laid-Open Patent Publication No. 92887/1978 (U.S. Pat. No. 4,205,021; West German OLS No. 2,803,598) filed by the present applicant.

Examples of the alpha-olefin having 3 to 10 carbon atoms to be copolymerized with ethylene in the copolymer (B), the other component of the composition of this invention, are propylene, 1-butene, 1-pentene, 1-hexene, 4-methyl-1-pentene, 1-octene, 1-decene and mixtures of these. Alpha-olefins having 3 to 5 carbon atoms, particularly 1-butene, are preferred.

The melt index of the copolymer (B) should be in the range of 0.1 to 50 g/10 min., preferably 1 to 30 g/10 min. If the melt index is less than 0.1 g/10 min., the flow characteristics of the resulting composition is poor, and good packaging films are difficult to obtain. On the other hand, if it exceeds 50 g/10 min., the mechanical strength of the resulting composition is reduced. The density of the copolymer (B) should be in the range of 0.870 to 0.900 g/cm³, preferably 0.875 to 0.895 g/cm³. When a copolymer (B) having a density of more than 0.900 g/cm³ is mixed with the copolymer (A), the resulting composition does not show an effect of imparting improved flexural resistance. On the other hand, if the density is lower than 0.870 g/cm³, the resin is sticky, and when the resin (B) is mixed with the copolymer (A) and the mixture is formed into a packaging film, the film inconveniently undergoes blocking. The ethylene content of the copolymer (B) is 85 to 95 mole%, preferably 88 to 95 mole%.

The crystallinity by X-ray of the copolymer (B) has a correlation with its density, and should be in the range of 5 to 40%, preferably 7 to 30%. When a copolymer (B) having a crystallinity of more than 40% is mixed with the copolymer (A), the resulting mixture does not exhibit improved flexural resistance. On the other hand, if the crystallinity is lower than 5%, the resin is sticky, and when it is mixed with the copolymer (A) and the mixture is formed into a packaging film, the film inconveniently undergoes blocking.

The copolymer (B) should have a melting point, determined from an endothermic curve by DSC at a temperature raising rate of 10° C./min., of 40° to 100° C., preferably 60° to 90° C. If a copolymer (B) having a melting point of more than 100° C. is mixed with the copolymer (A), there is no appreciable effect of decreasing the heat sealing temperature. If the melting point is lower than 40° C., the resulting packaging film has reduced heat resistance.

One method of producing the copolymer (B) having the aforesaid properties for use in this invention comprises copolymerizing ethylene with an alpha-olefin having 3 to 10 carbon atoms in the presence of a solvent using a catalyst composed of a vanadium compound, for example at least one compound selected from the group consisting of vanadyl trichloride, vanadyl monoethoxydichloride, triethoxyvanadyl, vanadium oxydiacetylacetonate and vanadium triacetylacetonate, and an organoaluminum compound. As the organoaluminum compound, an organoaluminum compound represented by the formula $R_nAlX_{3-n}$ (wherein R is a hydrocarbon group such as an alkyl group, n is a number represented by $0<n\leq 3$, and X is hydrogen, chlorine or an alkoxy group having 2 to 4 carbon atoms) is used conveniently as a co-catalyst. A mixture of two or more of such organoaluminum compounds may also be used if its average composition satisfies the above formula.

In order to obtain packaging films having excellent low-temperature heat sealability, heat seal strength, flexural resistance, transparency and impact strength from the composition of this invention, it is necessary that the ratio (wt. %) of the copolymer (A) to the copolymer (B) should be in the range of from 95:5 to 40:60, preferably from 90:10 to 60:40. If the proportion of the copolymer (B) is less than 5% by weight, the low-temperature heat sealability and flexural resistance of the films are not improved, and if the proportion of the copolymer (B) exceeds 60% by weight, the heat seal strength of the films is reduced.

Formation of packaging films from the composition of this invention may be effected by mixing the copolymer (A) and the copolymer (B) in the above-specified ratios, and molding the mixture into a film form. For example, it may be carried out by mixing the copolymers by a V-blender, a ribbon blender, a Henschel mixer, a tumbler blender, etc., and forming the mixture directly into a film by an ordinary film-forming method such as a T-die method or an inflation method. Or there can also be used a method which comprises kneading and granulating the aforesaid mixture by means of an extruder, a kneader, a Bunbury mixer, etc., and molding the granules into a film.

Various additives usually employed for polyolefins, such as weatherability stabilizers, heat stabilizers, antistatic agents, anti-clouding agents, anti-blocking agents, antislip agents, lubricants, pigments, dyes, and antistick agents may be added to the composition of this invention in an amount of the range not impairing the purpose of the invention.

Since the composition of this invention in the form of a film has excellent transparency, flexural resistance and impact strength, it can be used singly as a packaging film such as a food-packing wrap film, a stretch film, a shrink film or a general packaging film, an agricultural film, a protective film. Furthermore, by taking advantage of its low-temperature heat sealability, it can be laminated to various substrates to provide packaging films suitable for various uses. The thickness of the film can be selected properly. For example, when it is used singly, its preferred thickness is, for example, about 10 microns to about 100 microns, and when it is used as a laminate, its preferred thickness is, for example, about 1 to about 50 microns.

The substrate materials may, for example, be film-forming polymers, paper, aluminum foils, cellophane, etc. Examples of such polymers include olefinic polymers such as high-density polyethylene, medium-density polyethylene, low-density polyethylene, an ethylene/vinyl acetate copolymer, an ethylene/acrylate copolymer, an ionomer, polypropylene, poly-1-butene, or poly-4-methyl-1-pentene; vinyl-type polymers such as polyvinyl chloride, polyvinylidene chloride, polystyrene, polyacrylates, and polyacrylonitrile; polyamides such as nylon 6, nylon 66, nylon 7, nylon 10, nylon 11, nylon 12, nylon 610 and poly(m-xylylene adipamide); polyesters such as polyethylene terephthalate, polyethylene terephthalate-isophthalate, and polybutylene terephthalate; polyvinyl alcohol; an ethylene/vinyl alcohol copolymer; and polycarbonate. These polymers can be selected properly depending upon the purpose and an article to be packaged. For example, when the article to be packed is a perishable food, resins having excellent transparency, rigidity and gas-barrier property, such as polyamides, polyvinylidene chloride, an ethylene/vinyl alcohol copolymer, polyvinyl alcohol and polyesters, are selected. For packing confectionary and fibers, polypropylene having good transparency, rigidity and resistance to water permeation can, for example, be selected as the outside layer. When the substrate is a polymeric film or sheet, it may be monoaxially or biaxially stretched.

For the production of a composite film obtained by bonding the packaging film prepared from the ethylene/alpha-olefin copolymer composition of this invention to the substrate, various known methods, such as the dry laminating method, extrusion laminating method, sandwitch laminating method and co-extrusion method, can be used.

The packaging film composed of the ethylene/alpha-olefin copolymer composition of this invention has the advantage that it has better low-temperature heat sealability, heat seal strength, flexural resistance and hot tack property than high-pressure low-density polyethylene which is a conventional sealing material and better heat seal strength, heat resistance and rigidity than an ethylene/vinyl copolymer and is free from odor.

The composition of this invention can be used as packaging bags for packing various articles. Since it has excellent low-temperature heat sealability, hot tack property, impact strength, flexural resistance, tear strength, especially excellent impact strength and flexural strength at low temperatures, it can be suitably used for packing refrigerated foods, water-containing foods such as pickles, tofu and konjak, and oily foods such as curry, meat roasting sauce, soup, butter and cheese. Furthermore, because of its excellent flexural resistance (resistance to pinholes), it can also be suitably used as packaging bags for transporting liquids.

The following examples illustrate the present invention in greater detail. The invention, however, is not restricted by these examples so long as it does not go beyond the scope of the invention.

EXAMPLE 1

Preparation of a Copolymer (A): ethylene/4-methyl-1-pentene copolymer

A 200-liter continuous polymerization reactor was charged hourly with 80 liters of hexane as a solvent, 20 millimoles of a 2:3 mixture of diethyl aluminum chloride and triethylamine, and 0.28 millimole, calculated as titanium, of a catalyst prepared by adding dropwise 60 moles of ethanol, 27 moles of diethyl aluminum chloride and 100 moles of titanium tetrachloride in this order to 10 moles of anhydrous magnesium chloride in hexane to react them with each other. Simultaneously, 13.5 kg/hr of ethylene, 14.4 kg/hr of 4-methyl-1-pentene and 60 liters/hr of hydrogen were continuously fed into the polymerization reactor, and the monomers were copolymerized at a polymerization temperature of 145° C. and a total pressure of 30 kg/cm$^2$.G with a residence time of 1 hour under conditions such that the concentration of the polymer in the hexane solvent was 119 g/liter. The resulting copolymer [to be abbreviated as E-4MP copolymer (I)] had a melt index (190° C.) of 2.3, a crystallinity by X-rays of 51.0%, a melting point of 123.2° C. (a peak existed also at 118.7° C.), a molecular weight distribution ($\overline{M}_w/\overline{M}_n$) of 3.6, a density of 0.920 g/cm$^3$, an ethylene content of 96.2 mole%, an n-heptane-insoluble content of 20% by weight and a p-xylene-soluble content at room temperature of 6.5% by weight and contained 17.5 isobutyl groups per 1000 carbon atoms.

Preparation of a Copolymer (B): ethylene/1-butene copolymer

Ethylene and 1-butene were copolymerized continuously in a 15-liter stainless steel polymerization vessel equipped with stirring blades. Specifically, hexane as a polymerization solvent was continuously fed at a rate of 10 liters/hr into the polymerization vessel from its top. In the meanwhile, from the bottom of the polymerization vessel, the polymer solution was continuously withdrawn so that the volume of the polymerization solution in the polymerization vessel was kept always at 5 liters. As catalysts, vanadium oxychloride was continuously fed into the polymerization vessel from its top so that the concentration of vanadium atom in the polymerization vessel was kept at 0.2 millimole/liter, and ethyl aluminum sesquichloride [(C$_2$H$_5$)$_{1.5}$AlCl$_{1.5}$] was continuously fed into the polymerization vessel from its top so that the concentration of aluminum atoms in the vessel became 2.0 millimoles/liter. A gaseous mixture of 68 mole% of ethylene and 32 mole% of 1-butene was fed into the vessel from its top at a rate of 470 Nl/hr and hydrogen gas as a molecular weight controller, at a rate of 4.0 Nl/hr. The copolymerization reaction was carried out at 40° C. by circulating hot water through a jacket attached to the outside of the polymerization vessel. At this time, the pressure of the inside of the polymerization vessel was 2.4 kg/cm$^2$. When the copolymerization is carried out under the aforesaid conditions, an ethylene/1-butene copolymer can be obtained as a uniform solution. A small amount of methanol was added to the polymer solution withdrawn from the bottom of the polymerization vessel to stop the polymerization reaction. The polymer solution was added to a large amount of methanol and the polymer was taken out. The polymer was dried under reduced pressure at 80° C. for a day. The above procedure gave the ethylene/1-butene copolymer at a rate of 320 g/hr. The resulting copolymer [to be abbreviated as EB copolymer (II)] had a melt index of 4.0 g/10 min., a density of 0.890 g/cm$^3$, an ethylene content of 91.5% mole%, a crystallinity of 17%, and a melting point of 72° C.

Molding of a Packaging Film

90% by weight of the E-4MP copolymer (I) was mixed with 10% by weight of the EB copolymer (II) together with a heat stabilizer by means of a Henschel mixer. The mixture was molded into a film having a width of 230 mm and a thickness of 60 microns by means of a commercial tubular film former for polyolefins.

The resin temperature at the time of molding was 180° C. The extruder used had a screw diameter of 50 mm, a screw rotating speed of 40 rpm, a die diameter of 100 mm and a die slit width of 0.8 mm. and included two cooling air rings (first air ring-second air ring=380 mm).

The properties of the packaging film were evaluated by the following methods.

Haze (%): ASTM D 1003
Tear strength (Elmendorf: kg/cm): JIS Z 1702
Impact strength (kg.cm/cm): ASTM D 3420
Peel strength of the heat sealed part (g/15 mm):

The film surface was folded, heat-sealed by means of a seal bar having a width of 5 mm at a temperature of 90° C., 100° C., 110° C., 120° C., 130° C. and 140° C. respectively under a pressure of 2 kg/cm$^2$ for one second, and then allowed to cool. A test sample having a width of 15 mm was cut away from the sealed product, and the heat sealed part was peeled off at a cross head speed of 200 mm/min. And the peel strength of the heat sealed part at this time was measured.

Flexural resistance (the number of pinholes):

A sample, 282.6 mm×220 mm in size, was fixed in cylindrical form to a movable disc and a fixed disc having a diameter of 90 mm and spaced from each other by a distance of 180 mm, and a reciprocating torsional motion was given to the sample 1500 times at a speed of 50 times/min. in an atmosphere kept at −10° C. The number of pinholes which occurred in the sample during this period was counted. The stroke of the movable disc was 152.4 mm. While it moved over 88.0 mm, it gave a torsion of 440° to the sample and thereafter advanced over 63.5 mm to bend the sample.

Flexural rigidity (kg/cm$^2$):

A sample, 140 mm×140 mm, was provided, and flexural stress was imparted to the sample by using a Handle-O-Meter (manufactured by Thwing Albert Company, U.S.A.) with the slit width being adjusted to 5 mm. The maximum stress was determined and the quotient obtained by dividing it by the thickness of the sample was defined as flexural rigidity (kg/cm$^2$). The flexural rigidity was measured both in the longitudinal and transverse directions of the sample.

The results are shown in Table 1.

EXAMPLES 2 TO 4

The procedure of Example 1 was followed except that the blending ratio between the E-4MP copolymer (I) and the EB copolymer (II) was changed as shown in Table 1. The results are shown in Table 1.

COMPARATIVE EXAMPLE 1

The procedure of Example 1 was followed except that the E-4MP copolymer (I) of Example 1 was used singly. The results are shown in Table 1.

COMPARATIVE EXAMPLE 2

The procedure of Example 1 was followed except that an ethylene/propylene copolymer [to be abbreviated as EP copolymer (III) hereinbelow] having a melt index of 3.1 g/10 min., a density of 0.865 g/cm$^3$, an ethylene content of 81.5 mole%, a crystallinity of 3% and a melting point of 48° C. was used instead of the EB copolymer (II) of Example 1. The results are shown in Table 1.

COMPARATIVE EXAMPLE 3

The procedure of Example 1 was followed except that the ratio of the E-4MP copolymer (I) to the EB copolymer (II) in Example 1 was changed to 30:70. The results are shown in Table 1.

TABLE 1

|  |  |  | Ex. 1 | Ex. 2 | Ex. 3 | Ex. 4 | CEx. 1 | CEx. 2 | CEx. 3 |
|---|---|---|---|---|---|---|---|---|---|
| E-4MP copolymer (I) |  |  | 80 | 90 | 70 | 50 | 100 | 80 | 30 |
| EB copolymer (II) |  | wt. % | 20 | 10 | 30 | 50 | — | — | 70 |
| EP copolymer (III) |  |  | — | — | — | — | — | 20 | — |
| Haze |  | % | 3.7 | 3.5 | 3.4 | 2.8 | 4.1 | 3.3 | 2.5 |
| Tear strength | Longitudinal | kg/cm | 115 | 120 | 115 | 95 | 145 | 100 | 70 |
|  | Transverse |  | 135 | 145 | 130 | 110 | 160 | 120 | 90 |
| Impact strength |  | kg-cm/cm | 3600 | 3500 | 3600 | 3700 | 3500 | 3000 | 3800 |
| Peel strength of the heat-sealed part | 90° C. | g/15 mm | 200 | — | 300 | 500 | 13 | 40 | 600 |
|  | 100° C. |  | 830 | 560 | 910 | 920 | — | 80 | 940 |
|  | 110° C. |  | 1060 | 1080 | 1090 | 1050 | 970 | 930 | 980 |
|  | 120° C. |  | 1150 | 1170 | 1220 | 1170 | 1160 | 1040 | 1000 |
|  | 130° C. |  | 1300 | 1240 | 1360 | 1280 | 1380 | 1140 | 1020 |
|  | 140° C. |  | 1370 | 1400 | 1380 | 1330 | 1480 | 1180 | 1050 |
| Pinholes (at −10° C.) |  | Number | 1 | 5 | 0 | 0 | 11 | 2.5 | 0 |
| Flexural rigidity | Longitudinal | kg/cm$^2$ | 33 | 36 | 29 | 24 | 40 | 26 | 15 |
|  | Transverse |  | 35 | 39 | 30 | 25 | 47 | 28 | 17 |

EXAMPLE 5

A packaging film was formed in the same way as in Example 1 except that an ethylene/1-octene copolymer (to be abbreviated as EO copolymer hereinbelow) having a melt index (190° C.) of 1.01, a density of 0.930 g/cm$^3$, an ethylene content of 97.9 mole%, a crystallinity by X-rays of 53.7%, a melting point of 123.9° C. (a peak existed also at 121.3° C.) and a molecular weight distribution ($\overline{M}_w/\overline{M}_n$) of 4.4 was used instead of the E-4MP copolymer of Example 1, and the mixing ratio of the EO copolymer to the EB copolymer (II) of Example 1 was adjusted to 70:30 by weight. The results are shown in Table 2.

EXAMPLES 6 AND 7

A film having a thickness of 20 microns was formed by the same molding machine as used in Example 1 from a 50:50 (by weight) mixture of each of the E-4MP copolymer (I) used in Example 1 and the EO copolymer used in Example 5 with the EB copolymer (II) used in Example 1. The properties of the films were evaluated respectively by the method described in Example 1. The results are shown in Table 2.

TABLE 2

|  |  |  | Example 5 | Example 6 | Example 7 |
|---|---|---|---|---|---|
| E-4MP copolymer (I) |  |  | — | 50 | — |
| EO copolymer |  | wt. % | 70 | — | 50 |
| EB copolymer (II) |  |  | 30 | 50 | 50 |
| Haze |  | % | 3.6 | 2.7 | 3.0 |
| Tear Strength | Longitudinal | kg/cm | 70 | 90 | 50 |
|  | Transverse |  | 180 | 110 | 210 |
| Impact strength |  | kg-cm/cm | 2500 | 4000 | 3500 |
| Peel strength of the heat-sealed part | 90° C. | g/15 mm | — | 250 | 200 |
|  | 100° C. |  | 300 | 380 | 350 |
|  | 110° C. |  | 970 | 400 | 370 |
|  | 120° C. |  | 1220 | 420 | 400 |
|  | 130° C. |  | 1340 | 430 | 410 |
|  | 140° C. |  | 1350 | 440 | 420 |
| Pinholes (at −10° C.) |  | Number | 0 | 0 | 0 |
| Flexural rigidity | Longitudinal | kg/cm$^2$ | 41 | 17 | 20 |
|  | Transverse |  | 42 | 18 | 24 |

What is claimed is:

1. An ethylene/alpha-olefin copolymer composition characterized by comprising a mixture of 95 to 40% by weight of (A) a random copolymer of ethylene and an alpha-olefin having 5 to 10 carbon atoms having a melt index of 0.1 to 20 g/10 min., a density of 0.910 to 0.940 g/cm$^3$, a crystallinity by X-rays of 40 to 70%, a melting point of 115° to 130° C. and an ethylene content of 94 to 99.5 mole%, and 5 to 60% by weight of (B) a random copolymer of ethylene and an alpha-olefin having 3 to 10 carbon atoms having a melt index of 0.1 to 50 g/10 min., a density of 0.870 to 0.900 g/cm$^3$, a crystallinity by X-rays of 5 to 40%, a melting point of 40° to 100° C. and an ethylene content of 85 to 95 mole%.

2. The ethylene/alpha-olefin copolymer composition set forth in claim 1 wherein the alpha-olefin of the random copolymer (A) is 4-methyl-1-pentene.

3. The ethylene/alpha-olefin copolymer composition set forth in claim 1 wherein the alpha-olefin of the random copolymer (A) is 1-octene.

4. The ethylene/alpha-olefin copolymer composition set forth in claim 1 wherein the random copolymer (A) has a molecular weight distribution of not more than 6.

5. The ethylene/alpha-olefin copolymer composition set forth in claim 1 wherein the crystallinity by X-rays of the random copolymer (A) is 50 to 65%.

6. The ethylene/alpha-olefin copolymer composition wherein the crystallinity by X-rays of the random copolymer (B) is 7 to 30%.

7. The ethylene/alpha-olefin copolymer composition set forth in claim 1 wherein the mixing ratio of the random copolymer (A) to the random copolymer (B) is from 90:10 to 60:40.

* * * * *